(12) United States Patent
Yamazaki

(10) Patent No.: US 7,730,387 B2
(45) Date of Patent: Jun. 1, 2010

(54) DATA TRANSMISSION METHOD AND APPARATUS USING MULTIPLE SCRAMBLING CODES

(75) Inventor: Masato Yamazaki, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 1288 days.

(21) Appl. No.: 11/230,603

(22) Filed: Sep. 21, 2005

(65) Prior Publication Data

US 2006/0067531 A1 Mar. 30, 2006

(30) Foreign Application Priority Data

Sep. 28, 2004 (JP) ............... 2004-281046

(51) Int. Cl.
*H03M 13/09* (2006.01)
*H03M 13/33* (2006.01)
(52) U.S. Cl. .................................. 714/807
(58) Field of Classification Search .......... 714/807
See application file for complete search history.

(56) References Cited

U.S. PATENT DOCUMENTS 5,835,499 A 11/1998 Kimura et al.

7,318,185 B2 * 1/2008 Khandani et al. ........... 714/758

FOREIGN PATENT DOCUMENTS

| JP | 09-083390 | 3/1997 |
|----|-----------|--------|
| JP | 09-083391 | 3/1997 |
| JP | 11-215091 A | 8/1999 |
| JP | 2002-093058 A | 3/2002 |

* cited by examiner

*Primary Examiner*—Stephen M Baker
(74) *Attorney, Agent, or Firm*—Rabin & Berdo, P.C.

(57) ABSTRACT

A packet including data and a cyclic redundancy check code is encoded by using a selectable one of N scrambling codes (N>1). The encoded packet is transmitted and received, then decoded N times by using the N scrambling codes. The cyclic redundancy check code is used to decide which one of the N scrambling codes enabled the encoded packet to be decoded correctly, and the correctly decoded data are used. Packets with different formats, in particular with headers of different lengths, can be distinguished by the use of different scrambling codes, so that different formats can be employed without the need to transmit extra data to indicate which format has been used.

9 Claims, 4 Drawing Sheets

DATA TRANSMISSION METHOD AND APPARATUS USING MULTIPLE SCRAMBLING CODES

BACKGROUND OF THE INVENTION

1. Field of the Invention

The present invention relates to a data transmission method in which the transmitted data are scrambled (encoded) by a predetermined rule at the transmitting end to prevent concentration of power caused by a run of identical bits, and descrambled (decoded) at the receiving end. The invention also relates to a data transmission system, a data transmitter, and a data receiver employing this method.

2. Description of the Related Art

Figure 1:
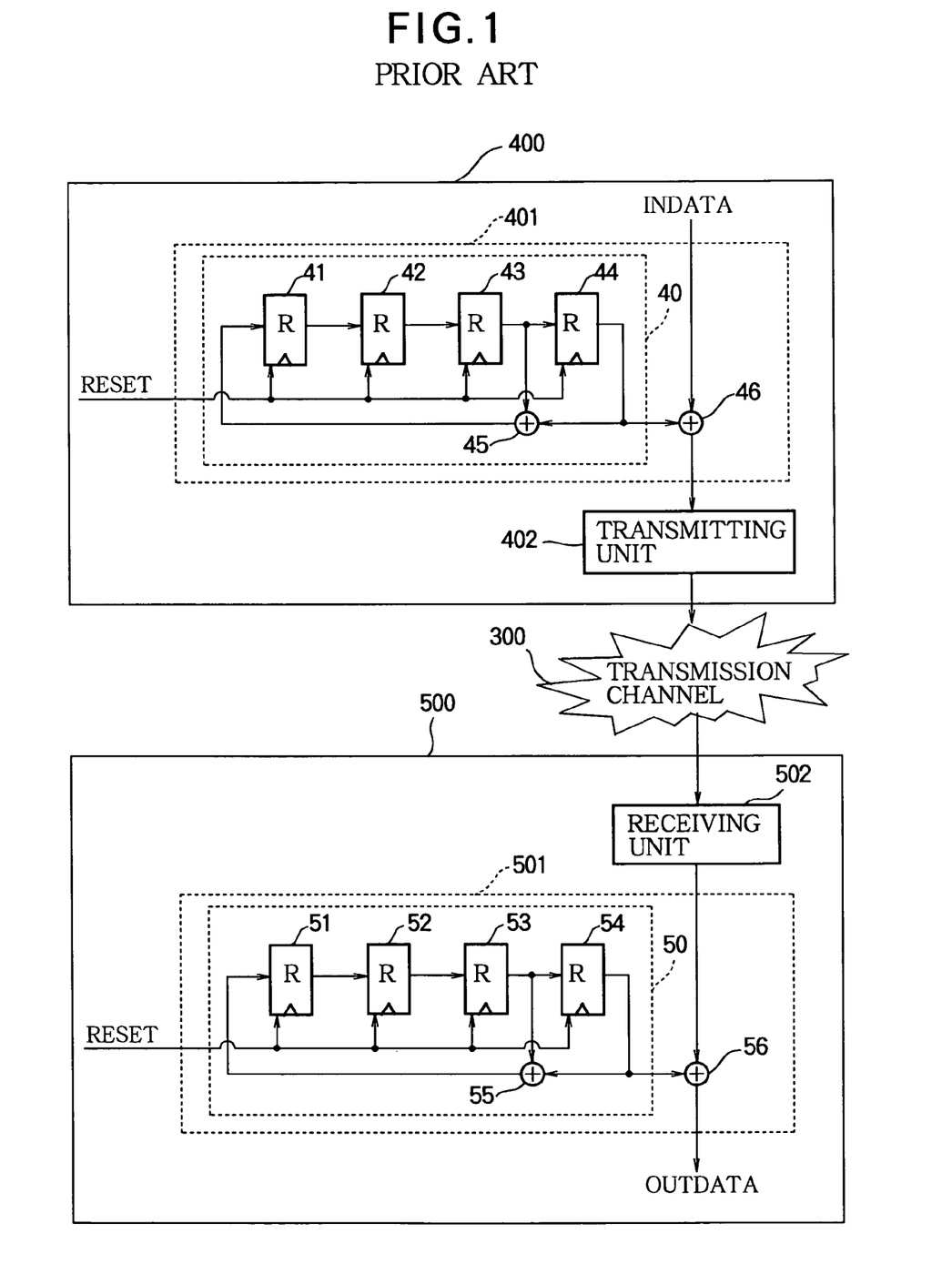
FIG. 1 is a block diagram of a conventional data transmission system.

FIG. 1 shows a conventional data transmission system comprising a transmission channel 300, a data transmitting apparatus 400, and a data receiving apparatus 500. The data transmitting apparatus 400 comprises an encoder 401 and a transmitting unit 402. The data receiving apparatus 500 comprises a decoder 501 and a receiving unit 502. The encoder 401 comprises a scrambling code generator 40 and an exclusive-OR (XOR) gate 46. The decoder 501 comprises a scrambling code generator 50 and an XOR gate 56. The scrambling code generator 40 in the encoder 401 is a linear feedback shift register comprising register cells 41, 42, 43, 44 and an XOR gate 45, which generate a cyclic code with the generator polynomial $Y=X^4+X+1$. The scrambling code generator 50 in the decoder 501 is a similar linear feedback shift register comprising register cells 51, 52, 53, 54 and an XOR gate 55, which generate the same cyclic code.

A reset signal (RESET) resets the scrambling code generators 40 and 50 at both the transmitting and receiving ends. Register cells 41 and 51 are reset to '1'; register cells 42, 43, 44, 52, 53, and 54 are reset to '0'. Following a reset, XOR gate 46 in the encoder 401 scrambles input data (INDATA) by XORing the successive input bits with successive code bits generated in scrambling code generator 40.

The bits of scrambled data are supplied from XOR gate 46 to the transmitting unit 402, which sends scrambled data to the receiving apparatus 500 through the transmission channel 300. The receiving unit 502 receives the scrambled data and supplies the successive bits of received data to XOR gate 56, which descrambles the data by XORing the successive bits with the output of the scrambling code generator 50. The decoder 501 outputs the descrambled bit data as output data (OUTDATA).

When each INDATA bit is input to XOR gate 46 in the scrambling code generator 40, the existing values in register cells 41, 42, and 43, and the logical exclusive OR of the values in register cells 43 and 44 are shifted into register cells 42, 43, 44, and 41, respectively; the scrambling code is output from register cell 44. Similarly, when each bit of data is input to XOR gate 56 in the scrambling code generator 50, the existing values in register cells 51, 52, and 53, and the logical exclusive OR of the values in register cells 53 and 54 are shifted into register cells 52, 53, 54, and 51, respectively; register cell 54 outputs the same scrambling code as at the transmitting end.

In addition to the conventional data transmission system shown in FIG. 1, there are also data transmission systems (disclosed in Japanese Patent Application Publications Nos. H9-83390 and H9-83391, for example), in which a data packet received by the decoder is not descrambled in the descrambling circuit when the packet includes invalid data in which an error is detected by use of a cyclic redundancy check (CRC) code, or when the packet is a parity packet.

In the conventional data transmission systems described above, packets are transmitted in fixed formats in which header information is added to the payload data or text. The header has a predetermined bit length. Most header formats include bits that almost always have predetermined default values and are only rarely used to transmit non-default information. For example, many formats include an urgent flag bit that is almost always '0', indicating the normal state, and is only rarely set to '1' to indicate an urgent packet. The header has to include this bit, because when set to '1' it conveys important information, but when cleared to '0', this bit serves only to increase the transmission overhead. The same is true of other header bits that convey important information that occurs with a low frequency. Due to the additional transmission overhead caused by such bits, the transmission channel is not used as effectively as could be desired.

SUMMARY OF THE INVENTION

An object of the present invention is to enable a transmission channel to be used effectively by enabling the transmission format to be modified without incurring additional transmission overhead.

In the invented method of transmitting data from a transmitting device to a receiving device, a packet including data and a CRC code is encoded by using a selectable one of a plurality of scrambling codes. The encoded packet is transmitted and received, then decoded a plurality of times by using the same scrambling codes. The CRC code is used to decide which one of the scrambling codes enabled the encoded packet to be decoded correctly, and the correctly decoded data are output.

This transmission method enables different transmission formats to be distinguished by the use of different scrambling codes. In particular, different scrambling codes can be used to encode packets with headers of different lengths. No additional data need be transmitted to indicate which format was used.

The different scrambling codes can be cyclic codes having identical generator polynomials, distinguished by being reset to different initial values, or reset after different numbers of transmitted bits, or by both of these methods.

The invention also provides a data transmitting apparatus that adds a CRC code to input data to create a packet and encodes the packet by a selectable one of a plurality of scrambling codes; a receiving apparatus that receives an encoded packet including a CRC code, generates a plurality of scrambling codes, decodes the packet by each scrambling code, and uses the CRC code to identify the correctly decoded data; and a data transmitting system including this type of data transmitting apparatus and receiving apparatus.

DETAILED DESCRIPTION OF THE INVENTION

An embodiment of the invention will now be described with reference to the attached drawings, in which analogous elements are indicated by analogous reference characters.

Figure 2:
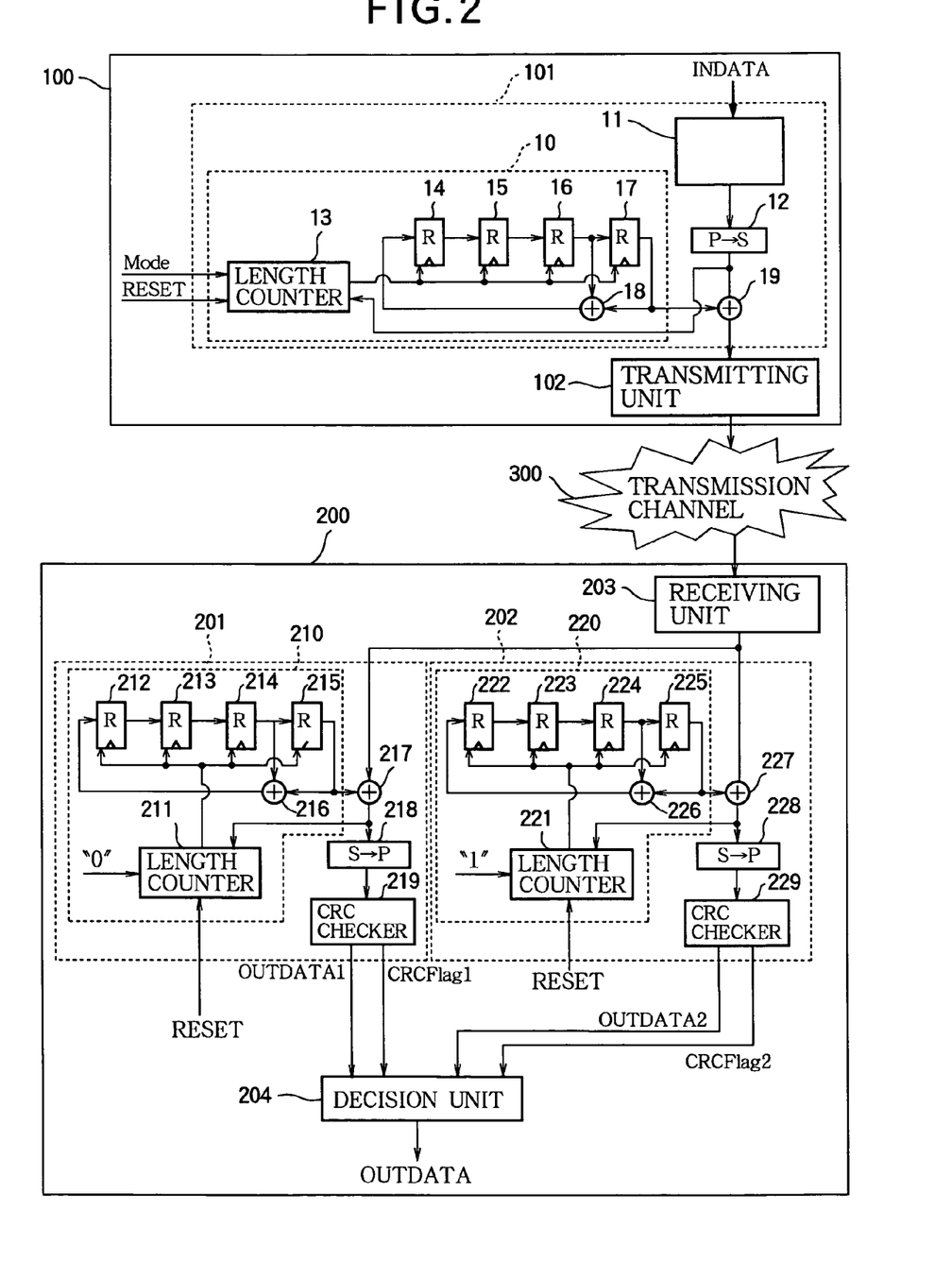
FIG. 2 is a block diagram of a data transmission system in an embodiment of the invention.

Referring to FIG. 2, the embodiment is a data transmission system comprising a data transmitting apparatus 100, a receiving apparatus 200, and transmission channel 300. The data transmitting apparatus 100 comprises an encoder 101 and a transmitting unit 102. The receiving apparatus 200 comprises a first decoder 201, a second decoder 202, a receiving unit 203, and a decision unit 204.

The encoder 101 comprises a scrambling code generator 10, a CRC inserter 11, a parallel-to-serial converter 12, and an exclusive-OR (XOR) gate 19. The first decoder 201 comprises a first scrambling code generator 210, an XOR gate 217, a serial-to-parallel converter 218, and a CRC checker 219. The second decoder 202 comprises a second scrambling code generator 220, an XOR gate 227, a serial-to-parallel converter 228, and a CRC checker 229. The CRC checkers 219, 229 and decision unit 204 in the data receiving apparatus 200 constitute a discriminator for discriminating between correctly and incorrectly descrambled data.

The scrambling code generator 10 in the encoder 101 includes a length counter 13 and a linear feedback shift register. The linear feedback shift register, comprising register cells 14, 15, 16, 17 and an XOR gate 18, generates a cyclic code with the generator polynomial $Y=X^4+X+1$. The first scrambling code generator 210 in the first decoder 201 includes a length counter 211 and a similar linear feedback shift register with register cells 212, 213, 214, 215 and an XOR gate 216, generating a cyclic code with the same generator polynomial $Y=X^4+X+1$. The second scrambling code generator 220 in the second decoder 202 comprises a length counter 221 and a similar linear feedback shift register with register cells 222, 223, 224, 225 and an XOR gate 226, also generating a cyclic code with generator polynomial $Y=X^4+X+1$.

A stream of byte-wide (or word-wide) data to be transmitted, including header information, is input as packet data (INDATA) to the encoder 101. The CRC inserter 11 appends a CRC code to the input data INDATA to create a packet. The parallel-to-serial converter 12 converts the packet, including the CRC code, from parallel data to bit-serial data. The scrambling code generator 10 generates a first or second scrambling code (both scrambling codes having the same generator polynomial $Y=X^4+X+1$) in bit-serial format. The scrambling code is output from register cell 17. XOR gate 19 XORs each bit of data output from the parallel-to-serial converter 12 with the corresponding bit output from register cell 17, and sends the result to the transmitting unit 102.

A mode signal (Mode) input to the length counter 13 in the encoder 101 selects either the first scrambling code or the second scrambling code. The length counter 13 counts bits output from the parallel-to-serial converter 12, and outputs a signal to the reset terminals of register cells 14, 15, 16, 17 when the count reaches a predetermined value. The predetermined value is a first value ($\phi$) in the first scrambling mode, when the mode signal is '0' (Mode=0), and a second value ($\theta$) in the second scrambling mode, when the mode signal is '1' (Mode=1). It will be assumed below that $\theta$ is less than $\phi$ ($\theta<\phi$). Upon reaching the predetermined value, the count is reset to zero and the length counter 13 resumes counting upward from zero. The output signal of the counter 13 is asserted when the count value is zero and deasserted when the counter value is greater than zero.

The output of the encoder 101 is sent from the transmitting unit 102 to the receiving unit 203 in the receiving apparatus 200 through the transmission channel 300, and input to the first decoder 201 and the second decoder 202.

The first scrambling code generator 210 in the first decoder 201 and the second scrambling code generator 220 in the second decoder 202 have the same structure as the scrambling code generator 10 in the encoder 101 except for the inputs to the length registers. The difference between the first scrambling code generator 210 and scrambling code generator 10 is that the signal input to length counter 211, corresponding to the mode signal (Mode) input to length counter 13, has a fixed value of '0'. The difference between second scrambling code generator 220 and scrambling code generator 10 is that the signal input to length counter 221, corresponding to the mode signal input to length counter 13, has a fixed value of '1'.

The first decoder 201 receives input bit data from the receiving unit 203. Like the scrambling code generator 10 in the encoder 101, the length counter 211, register cells 212, 213, 214, 215, and XOR gate 216 in the first scrambling code generator 210 generate a scrambling code with the generator polynomial $Y=X^4+X+1$. XOR gate 217 XORs the bit data received from the receiving unit 203 with this scrambling code, which is output in bit-serial format from register cell 215.

The serial-to-parallel converter 218 converts the bit-serial data output from XOR gate 217 into a stream of byte-wide (or word-wide) data in parallel format.

The CRC checker 219 receives the converted data, removes the CRC field (CRC code), which the CRC inserter 11 in the encoder 101 appended to the input data (INDAT), and outputs the remaining data as first output packet data (OUTDATA1) to the decision unit 204. The CRC checker 219 also uses the CRC code to check the first output packet data (OUTDATA1), and outputs the result as a first flag (CRCFlag1) to the decision unit 204.

The length counter 211 counts the bits output from XOR gate 217 to the serial-to-parallel converter 218, operating like the length counter 13 in the encoder 101 when the mode signal is '0', and outputs a signal to the reset terminals of register cells 212, 213, 214, 215 every $\phi$ bits. The scrambling code output by the first scrambling code generator 210 is therefore identical to the first scrambling code output by the scrambling code generator 10 in the encoder 101 in the data transmitting apparatus 100.

The second decoder 202 receives the same input bit data from the receiving unit 203. Like the scrambling code generator 10 in the encoder 101, the length counter 221, register cells 222, 223, 224, 225, and XOR gate 226 in the second scrambling code generator 220 generate a scrambling code with the generator polynomial $Y=X^4+X+1$. XOR gate 227 similarly XORs the bit data received from the receiving unit 203 with this scrambling code, which is output in bit-serial format output from register cell 225.

The serial-to-parallel converter 228 converts the bit data output from XOR gate 227 from bit-serial format into a stream of byte-wide (or word-wide) data in parallel format.

The CRC checker 229 receives the converted data, removes the CRC field (CRC code), which the CRC inserter 11 in the encoder 101 appended to the input data (INDATA), and outputs the remaining data as second output packet data (OUTDATA2) to the decision unit 204. The CRC checker 229 also uses the CRC code to check the second output packet data (OUTDATA2), and outputs the result as a second flag (CRCFlag2) to the decision unit 204.

The length counter 221 counts the bits output from XOR gate 227 to the serial-to-parallel converter 228, operating like the length counter 13 in the encoder 101 when the mode signal is '1', and outputs a signal to the reset terminals of register cells 222, 223, 224, 225 every θ bits. The scrambling code output by the first scrambling code generator 210 is therefore identical to the second scrambling code output by the scrambling code generator 10 in the encoder 101 in the data transmitting apparatus 100.

The first and second scrambling codes are identical for their initial θ bits (θ/8 bytes or θ/16 words). After the initial θ-bit segment, however, the first scrambling code differs markedly from the second scrambling code.

The decision unit 204 decides from the first flag (CRCFlag1) and second flag (CRCFlag2) which one of the first output packet data (OUTDATA1) and second output packet data (OUTDATA2) includes correctly decoded data, and outputs the correctly decoded data as output packet data (OUTDATA). If both the first and second flags (CRCFlag1 and CRCFlag2) have values indicating that an error was detected by the CRC code check, the decision unit 204 suspends output of data (OUTDATA) and outputs, for example, an indication that the transmitted data were in error.

Figure 3:
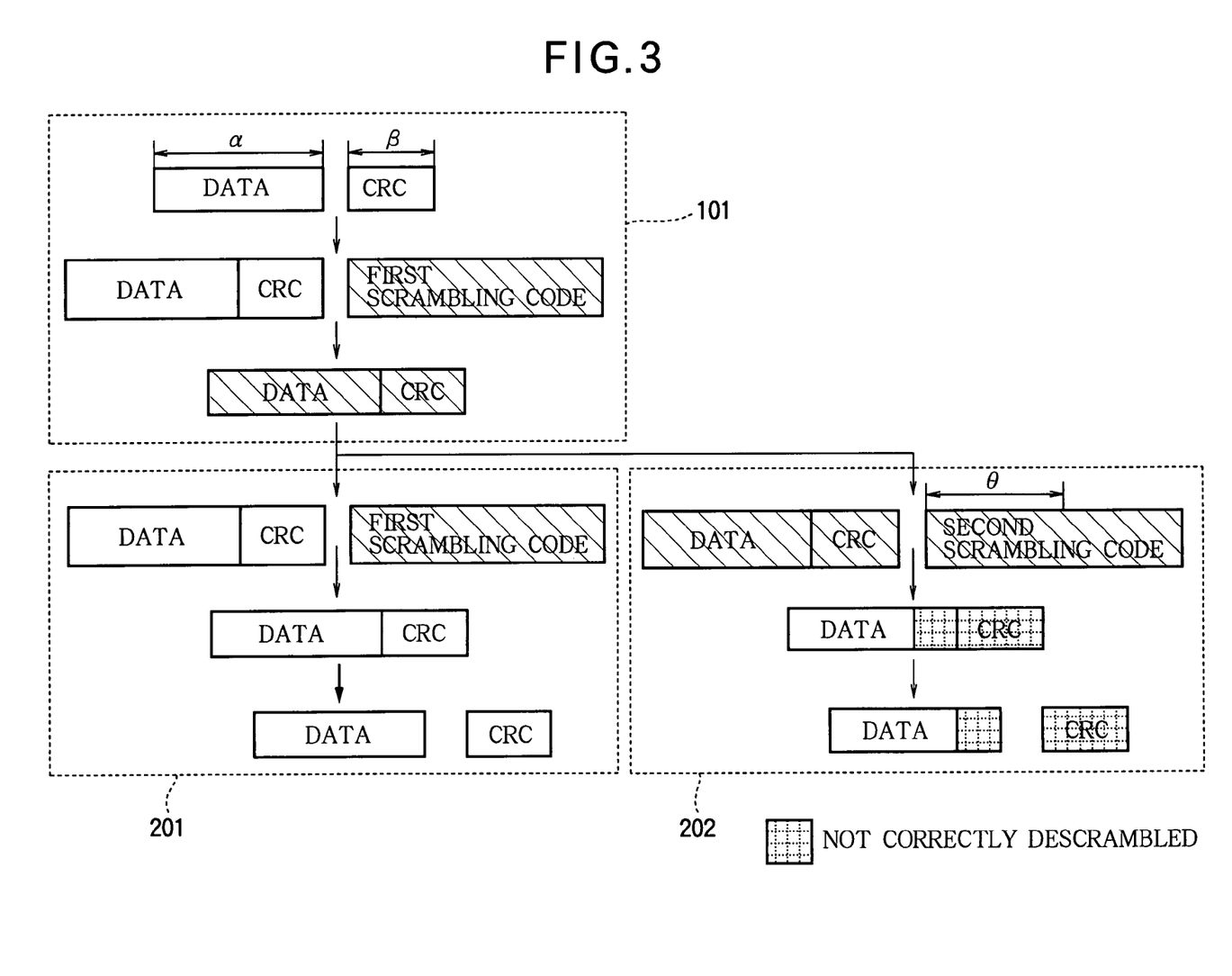
FIG. 3 is a block diagram illustrating operations in a first scrambling processing mode in the embodiment of the invention.
Figure 4:
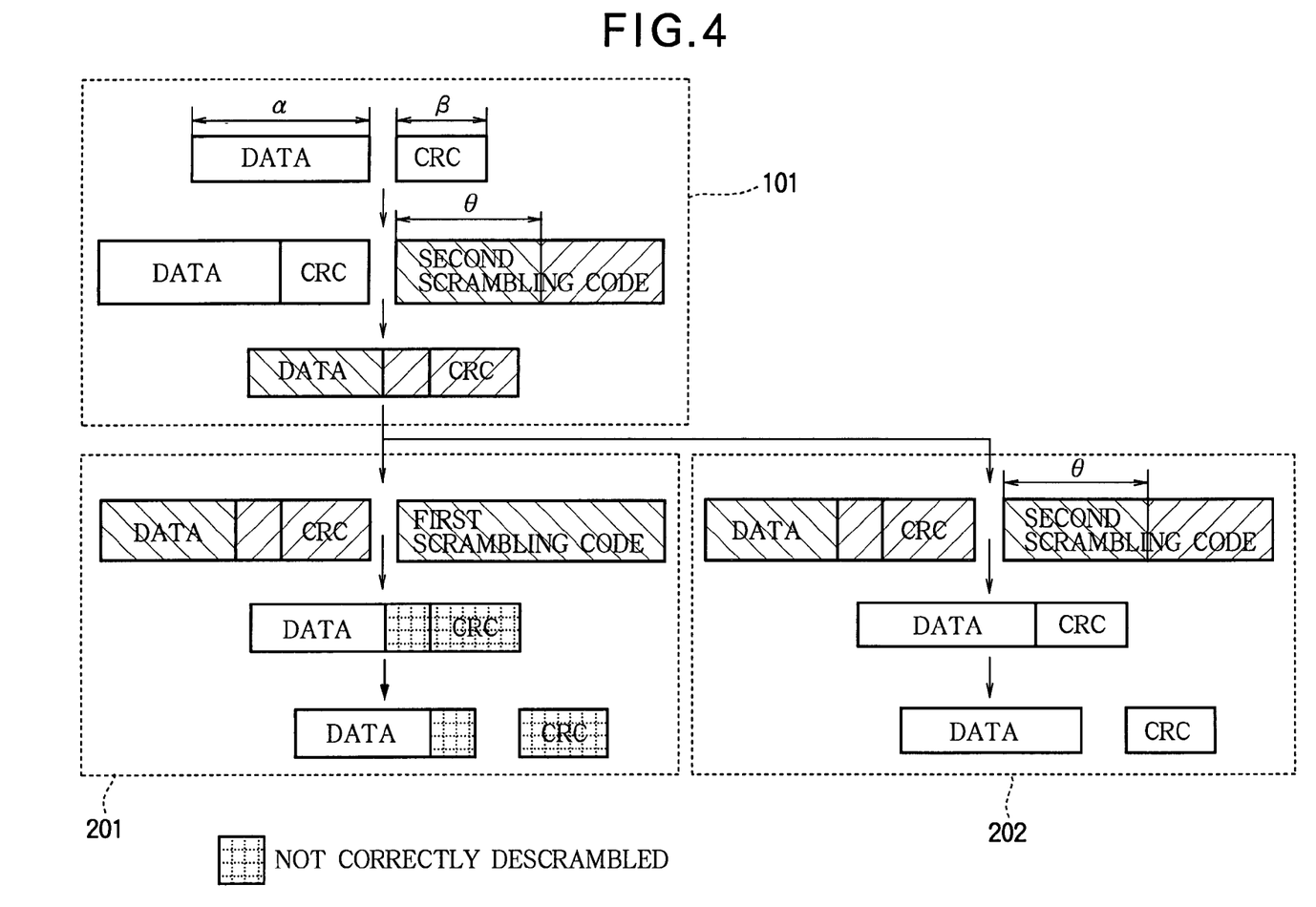
FIG. 4 is a block diagram illustrating operations in a second scrambling processing mode in the embodiment of the invention.

FIG. 3 illustrates the operation of the embodiment in the first scrambling mode when the mode signal input to the length counter 13 in the encoder 101 is '0' (Mode=0); FIG. 4 illustrates the operation of the embodiment in the second scrambling mode when the mode signal is '1' (Mode=1).

In FIGS. 3 and 4, the data field includes a preamble, header information, and the text to be transmitted from the transmitting end to the receiving end, and has a total length of ($\alpha$ bits ($\alpha/8$ bytes or $\alpha/16$ words). The CRC field appended to the data field has a length of $\beta$ bits ($\beta/8$ bytes or $\beta/16$ words). Accordingly, the length of the transmitted packet is ($\alpha+\beta$) bits. It will be assumed below that the packet length is strictly greater than the smaller counting parameter θ and equal to or less than the second counting parameter $\phi$ ($\theta < \alpha+\beta \leq \phi$).

Before transmission and reception of the data packet in the examples in FIGS. 3 and 4 begins, a reset signal (RESET) is input to the length counters 13, 211, 221 in the encoder 101, the first scrambling code generator 210, and the second scrambling code generator 220, resetting the length counters 13, 211, 221 to zero. The signals output from the length counters 13, 211, 221 are asserted, resetting the linear feedback shift register comprising register cells 14, 15, 16, 17 and XOR gate 18 in the scrambling code generator 10, the linear feedback shift register comprising register cells 212, 213, 214, 215 and XOR gate 216 in the first scrambling code generator 210, and the linear feedback shift register comprising register cells 222, 223, 224, 225 and XOR gate 226 in the second scrambling code generator 220.

If the mode signal (Mode) is '1', the length counter 13 in the encoder 101 counts up to the smaller parameter θ (where $\theta < \alpha+\beta$), then reasserts its output signal, resetting the linear feedback shift register in the scrambling code generator 10. Similarly, the length counter 221 that receives a fixed '1' input corresponding to the mode signal counts up to θ, then reasserts its output signal, resetting the linear feedback shift register in the second scrambling code generator 220.

If the mode signal (Mode) is '0', the length counter 13 in the encoder 101 counts up to the larger parameter $\phi$ (where $\phi \geq \alpha+\beta$), then reasserts its output signal, resetting the linear feedback shift register in the scrambling code generator 10. Similarly, the length counter 211 that receives a fixed '0' input corresponding to the mode signal counts up to $\phi$, then reasserts its output signal, resetting the linear feedback shift register in the first scrambling code generator 210. The parameter $\phi$ may be set to a value so large that it is never reached during normal operation (in effect, $\phi=\infty$), in which case length counters 13 and 221 assert their outputs only when they receive a reset signal.

First, the operation in the first scrambling mode when the mode signal is '0' (Mode=0) will be described below, with reference to FIG. 3. Before the encoder 101 receives the first input packet data (INDATA), the length counter 13 in the scrambling code generator 10 receives a reset signal (RESET), is reset to zero, and asserts its output signal, resetting register cell 14 to one and register cells 15, 16, 17 to zero.

When the CRC inserter 11 in the encoder 101 receives a stream of byte-wide (or word-wide) input data (INDATA), the CRC inserter 11 outputs the $\alpha$ bits of the data field to the parallel-to-serial converter 12 as it receives them, at the same time generating a CRC code; then it outputs the $\beta$ bits of the generated CRC code to the parallel-to-serial converter 12. The parallel-to-serial converter 12 converts the data and CRC fields from parallel data format to bit-serial data format, and XOR gate 19 receives the converted serial bit data.

XOR gate 19 XORs the first bit of data output from the parallel-to-serial converter 12 with the corresponding bit output from register cell 17 in the scrambling code generator 10, and sends the result to the transmitting unit 102. Concurrently, when the first bit of data is input to the length counter 13, the length counter 13 is incremented from '0' to '1' and the signal output from the length counter 13 is deasserted. Since this signal is no longer asserted, before the next bit of data is output from the parallel-to-serial converter 12, the values output from register cells 14, 15, 16, and the exclusive logical OR of the values from register cells 16 and 17 by XOR gate 18 are shifted into register cells 15, 16, 17, and 14, respectively.

XOR gate 19 XORs the next (second) bit of data output from the parallel-to-serial converter 12 with the corresponding bit output from the register cell 17 (the value shifted in from register cell 16) and sends the result to the transmitting unit 102. Concurrently, when the second bit of data is input to the length counter 13, the length counter 13 is incremented from '1' to '2', and the existing values in register cells 14, 15, and 16, and the exclusive logical OR of the values in register cells 16 and 17 are shifted into register cells 15, 16, 17, and 14, respectively.

The operation described above is repeated for every bit of data in the data and CRC fields. The scrambled bit-serial output from XOR gate 19 in encoder 101 is transmitted from the transmitting unit 102 in the data transmitting apparatus 100 through the transmission channel 300 to the receiving apparatus 200.

Next, the operations of the first decoder 201 and the second decoder 202 will be described. The two decoders operate differently because the length counter 211 in the first decoder 201 receives a '0' input corresponding to the mode signal, while the length counter 221 in the second decoder 202 receives a '1'.

The data transmitted from the data transmitting apparatus 100 are input to the receiving unit 203 in the receiving apparatus 200 through the transmission channel 300, and output from the receiving unit 203 to the first decoder 201 and the second decoder 202.

In the first scrambling mode, when the mode signal input to the data transmitting apparatus 100 is '0' (Mode=0), the first scrambling code generator 210 in the first decoder 201 performs the same operation as the scrambling code generator 10 in the encoder 101.

Before the first decoder 201 receives the transmitted data from the encoder 101, the length counter 211 in the first scrambling code generator 210 receives a reset signal (RESET), is reset to zero, and asserts its output signal, resetting register cell 212 to one, and register cells 213, 214, 215 to zero, operating like the length counter 13 in the scrambling code generator 10 in the encoder 101.

When the receiving unit 203 receives the transmitted data from the encoder 101, the receiving unit 203 outputs the input bit data to XOR gate 217 in the first decoder 201.

XOR gate 217 XORs the first bit of data output from the receiving unit 203 with the corresponding bit output from the register cell 215, which is the output of the first scrambling code generator 210, and sends the result to the serial-to-parallel converter 218. Concurrently, when the first bit of data output from XOR gate 217 is input to the length counter 211, the length counter 211 is incremented from '0' to '1', deasserting the signal output from the length counter 211. Since this signal is no longer asserted, before XOR gate 217 receives the next bit of data, the values output from register cells 212, 213, and 214, and the exclusive logical OR of the values from register cells 214 and 215 are shifted into register cells 213, 214, 215, and 212, respectively.

XOR gate 217 XORs the next (second) bit of data input to XOR gate 217 with the corresponding bit output from the register cell 215 (the value shifted in from register cell 214) and sends the result to the serial-to-parallel converter 218. Concurrently, when the second bit of data output from XOR gate 217 is input to the length counter 211, the length counter 211 is incremented from '1' to '2', and the existing values in register cells 212, 213, and 214, and the exclusive logical OR of the values in register cells 214 and 215 are shifted into register cells 213, 214, 215, and 212, respectively.

The operation described above is repeated for every bit of input data included in the data and CRC fields. The decoded bits are temporarily stored in the serial-to-parallel converter 218. When the serial-to-parallel converter 218 holds one byte (or word) of data, it outputs the byte (or word) to the CRC checker 219.

The CRC checker 219 outputs the α bits of the data field without alteration as first output packet data (OUTDATA1), and uses the β bits of the CRC code to check the α bits of the data field. The CRC checker 219 does not output the β bits of CRC data in the first output packet data (OUTDATA1), but outputs the result of the CRC check as a first flag (CRCFlag1) after receiving the β bits.

In the first scrambling mode, because the length counter 211 in the first decoder 201 receives a signal which has the same value of '0' as the mode signal (Mode) input to the length counter 13 in the encoder 101, and the first scrambling code generator 210 in the first decoder 201 performs the same operation and generates the same first scrambling code as the scrambling code generator 10 in the encoder 101, the input data can be descrambled correctly in the first decoder 201.

Accordingly, provided no transmission error has occurred in the transmission channel 300 (provided the data output from the encoder 101 are identical to the data input to the first decoder 201), no error is detected by the CRC code check, and the CRC checker 219 in the first decoder 201 sets the first flag (CRCFlag1) to '1'; if a transmission error occurs in the transmission channel 300 (the data output from the encoder 101 differ from the data input to the first decoder 201), an error is detected by the CRC code check, so the CRC checker 219 sets the first flag (CRCFlag1) to '0'.

Since the length counter 221 in the second decoder 202 receives a '1' signal, differing from the '0' mode signal (Mode) input to the length counter 13 in the encoder 101, when θ bits of data have been received, the length counter 221 is reset to zero and asserts its output signal, resetting register cell 222 to one and register cells 223, 224, 225 to zero.

That is, the second scrambling code generator 220 in the second decoder 202 operates differently from the scrambling code generator 10 in the encoder 101 and generates a second scrambling code differing from the first scrambling code generated in the scrambling code generator 10. As a result, the second decoder 202 cannot descramble the input data correctly in the first scrambling mode.

Since the input data cannot be descrambled correctly in the second decoder 202, the CRC checker 229 normally detects an error during the CRC code check, and outputs '0' as the second flag (CRCFlag2).

In the first scrambling mode (Mode=0), accordingly, provided no transmission error has occurred, the decision unit 204 receives correctly descrambled first output packet data (OUTDATA1) and an affirmative first flag (CRCFlag1=1) from the first decoder 201, but receives incorrectly descrambled second output packet data (OUTDATA2) and a negative second flag (CRCFlag2=0) from the second decoder 202.

The decision unit 204 decides from the values of the first and second flags (CRCFlag1 and CRCFlag2) which of the first and second output packet data (OUTDATA1 and OUTDATA2) have been correctly descrambled. If the first and second flags indicate that just one of the output packets has been correctly descrambled, the decision unit 204 selects and outputs that packet as output packet data (OUTDATA) from the first decoder 201. In the first scrambling mode, the decision unit 204 normally outputs the first output packet data (OUTDATA1). If necessary, the decision unit 204 may also output information indicating which of the first and second scrambling codes was used to obtain the output packet data (OUTDATA) (in this case, information indicating that the first scrambling code was used: that is, that the data transmitting apparatus 100 sent the data in the first scrambling mode).

Next, the operation in the second scrambling mode when the mode signal input to the data transmitting apparatus 100 is '1' (Mode=1) will be described below, with reference to FIG. 4. Since in the second scrambling mode, the length counter 13 in the encoder 101 receives the '1' mode signal, the second scrambling code generator 220 in the second decoder 202, instead of the first scrambling code generator 210 in the first decoder 201 in the first scrambling mode, performs the same operation as the scrambling code generator 10 in the encoder 101.

When θ bits of data have been transmitted, the length counter 13 in the encoder 101 is reset to zero, and asserts its output signal, resetting register cell 14 to one and register cells 15, 16, 17 to zero.

When θ bits of data have been received, the length counter 221 in the second decoder 202 is reset to zero, and asserts its output signal, resetting register cell 222 to one and register cells 223, 224, 225 to zero, operating like the length counter 13 in the encoder 101.

Since in the second scrambling mode, the length counter 221 in the second decoder 202 receives a signal which has the same value of '1' as the mode signal (Mode) input to the length counter 13 in the encoder 101, and the second scrambling code generator 220 in the second decoder 202 performs the same operation and generates the same second scrambling code as the scrambling code generator 10 in the encoder 101, the input data can be descrambled correctly in the second decoder 202.

Accordingly, provided no transmission error has occurred in the transmission channel 300 (provided the data output from the encoder 101 are identical to the data input to the second decoder 202), no error is detected by the CRC code check, and the CRC checker 229 in the second decoder 202 sets the second flag (CRCFlag2) to '1'; if a transmission error occurs in the transmission channel 300 (the data output from the encoder 101 differ from the data input to the second decoder 202), an error is detected by the CRC code check, so the CRC checker 229 sets the second flag (CRCFlag2) to '0'.

Since the length counter 211 in the first decoder 201 receives a '0' signal, differing from the '1' mode signal (Mode) input to the length counter 13 in the encoder 101, even if θ bits of data have been received, the length counter 211 does not assert its output signal, and does not reset register cells 212, 213, 214, 215.

That is, the first scrambling code generator 210 in the first decoder 201 operates differently from the scrambling code generator 10 in the encoder 101 and generates a first scrambling code differing from the second scrambling code generated in the scrambling code generator 10. As a result, the first decoder 201 cannot descramble the input data correctly in the second scrambling mode.

Since the input data cannot be descrambled correctly in the first decoder 201, the CRC checker 219 normally detects an error during the CRC code check, and outputs '0' as the first flag (CRCFlag1).

In the second scrambling mode (Mode=1), accordingly, provided no transmission error has occurred, the decision unit 204 receives correctly descrambled second output packet data (OUTDATA2) and an affirmative second flag (CRCFlag2=1) from the second decoder 202, but receives incorrectly descrambled first output packet data (OUTDATA1) and a negative first flag (CRCFlag1=0) from the first decoder 201.

The decision unit 204 decides from the values of the first and second flags (CRCFlag1 and CRCFlag2) which of the first and second output packet data (OUTDATA1 and OUTDATA2) have been correctly descrambled. If the first and second flags indicate that just one of the output packets has been correctly descrambled, the decision unit 204 selects and outputs that packet as output packet data (OUTDATA) from the second decoder 202. In the second scrambling mode, the decision unit 204 normally outputs the second output packet data (OUTDATA2). If necessary, the decision unit 204 may also output information indicating which of the first and second scrambling codes was used to obtain the output packet data (OUTDATA) (in this case, information indicating that the second scrambling code was used: that is, that the data transmitting apparatus 100 sent the data in the second scrambling mode).

The embodiment described above enables the scrambling code that was used at the transmitting end to be identified at the receiving end. This capability can be exploited by, for example, using the first scrambling code to scramble packets with relatively short headers, and the second scrambling code to scramble packets with relatively long headers including bits that are occasionally used to indicate urgency or other special information. By identifying the scrambling code, the receiving apparatus can also identify the header length and distinguish correctly between header and payload data.

If this scheme is used, then in the normal case, when all of the special information bits have their default values, the special information bits can all be omitted to reduce the header to the minimum necessary length, making the maximum number of bits available for transmitting data. This scheme involves no transmission overhead, because the packet need not include even one bit to distinguish the short-header format from the long-header format.

Absent the length counters 13, 211, 221, the cyclic codes generated by the linear feedback shift register comprising register cells 14, 15, 16, 17 and XOR gate 18 in the encoder 101, the similar linear feedback shift register comprising register cells 212, 213, 214, 215 and XOR gate 216 in the first decoder 201, and the similar linear feedback shift register comprising register cells 222, 223, 224, 225 and XOR gate 226 in the second decoder 202 are maximum-length sequences (m-sequences) generated according to the generator polynomial $Y=X^4+X+1$. If (a, b, c, d) represents the contents of register cells 17 (215, 225), 16 (214, 224), 15 (213, 223), 14 (212, 222), then in the embodiment described above, each linear feedback shift register has the same the initial state $(a_0, b_0, c_0, d_0)=(0, 0, 0, 1)$, which changes to state $(a_1, b_1, c_1, d_1)=(0, 0, 1, 0)$, then to $(a_2, b_2, c_2, d_2)=(0, 1, 0, 0)$, and so on through $(a_{14}, b_{14}, c_{14}, d_{14})=(1, 0, 0, 0)$, then returns to the initial state $(a_0, b_0, c_0, d_0)=(0, 0, 0, 1)$ and keeps repeating cyclically. The m-sequence in this case is the fifteen-bit sequence given by the successive values of bit 'a' (0, 0, 0, 1, 0, 0, 1, 1, 0, 1, 0, 1, 1, 1, 1).

In the embodiment above, the first scrambling code and the second scrambling code both start from the same initial state $(a_0, b_0, c_0, d_0)$, but are reset to this state after different numbers of bits φ and θ. If each packet is preceded by a counter reset, then at least one of φ and θ must be less than the packet length; if both φ and θ are less than the packet length, they must also have different remainders when divided by the m-sequence length, in this embodiment different remainders when divided by fifteen. (In FIG. 3, φ is equal to or greater than the packet length, so φ is in effect infinite and only θ is indicated.)

In a variation of the preceding embodiment, the first scrambling code and the second scrambling codes have the same generator polynomial and thus the same linear feedback shift register structure, but start from different initial states. In this case, the initial states of both scrambling codes may be loaded into the respective linear feedback shift registers after the same number of output bits (φ=θ) or after different numbers of output bits (φ≠θ).

In a further variation of the preceding embodiment, the data transmitting apparatus uses a selectable one of N scrambling codes, where N is an integer greater than two, and the receiving apparatus 200 has N decoders, each using a different one of the N scrambling codes to descramble the received data. This variation can be used to transmit packets in N different formats without incurring extra overhead to distinguish between the formats.

Those skilled in the art will recognize that further variations are possible within the scope of invention, which is defined by the appended claims.

What is claimed is:

1. A data transmitting apparatus, comprising:
   a CRC inserter for adding a CRC code to input data to create a packet;
   a scrambling code generator for generating either a first scrambling code or a second scrambling code as selected by a control signal;
   an encoder using the scrambling code generated by the scrambling code generator to encode the packet created by the CRC inserter; and
   a transmitting unit for transmitting the encoded packet,
   wherein the scrambling code generator comprises:
      a linear feedback shift register generating a cyclic code according to a predetermined generator polynomial; and
      a length counter for counting bits of the encoded packet and resetting the linear feedback shift register to a predetermined initial value after either a first number of bits or a second number of bits as selected by the control signal; and wherein the first scrambling code includes the first number of bits output from the linear feedback shift register and the second scrambling code includes the second number of bits output from the linear feedback shift register.

2. A data transmitting apparatus, comprising:
a CRC inserter for adding a CRC code to input data to create a packet;
a scrambling code generator for generating either a first scrambling code or a second scrambling code as selected by a control signal;
an encoder using the scrambling code generated by the scrambling code generator to encode the packet created by the CRC inserter; and
a transmitting unit for transmitting the encoded packet,
wherein the scrambling code generator comprises:
   a linear feedback shift register generating a cyclic code according to a predetermined generator polynomial; and
   a length counter for counting bits of the encoded packet and resetting the linear feedback shift register to either a first initial value or a second initial value, as selected by the control signal, after a predetermined number of bits; and
wherein the first scrambling code includes the predetermined number of bits output from the linear feedback shift register.

3. A data transmitting apparatus, comprising:
a CRC inserter for adding a CRC code to input data to create a packet;
a scrambling code generator for generating either a first scrambling code or a second scrambling code as selected by a control signal;
an encoder using the scrambling code generated by the scrambling code generator to encode the packet created by the CRC inserter; and
a transmitting unit for transmitting the encoded packet,
wherein the scrambling code generator comprises:
   a linear feedback shift register generating a cyclic code according to a predetermined generator polynomial; and
   a length counter for counting bits of the encoded packet and resetting the linear feedback shift register to either a first initial value after a first number of bits or a second initial value after a second number of bits, as selected by the control signal; and
wherein the first scrambling code includes the first number of bits output from the linear feedback shift register and the second scrambling code includes the second number of bits output from the linear feedback shift register.

4. A data receiving apparatus comprising:
a receiving unit for receiving an encoded packet including a CRC code;
a first code generator for generating a first scrambling code;
a second code generator for generating a second scrambling code;
a first decoder for decoding the received encoded packet by using the first scrambling code to obtain a first decoded packet;
a second decoder for decoding the received encoded packet by using the second scrambling code to obtain a second decoded packet;
a first checker for using the CRC code to detect errors in the first decoded packet;
a second checker for using the CRC code to detect errors in the second decoded packet; and
a decision unit for deciding, from results of error detection by the first checker and the second checker, whether any one of the first decoded packet and the second decoded packet was decoded correctly.

5. The receiving apparatus of claim 4, wherein:
the first decoder is an exclusive-OR gate taking a bit-wise exclusive logical OR of the first scrambling code and the received packet;
the second decoder is an exclusive-OR gate taking a bit-wise exclusive logical OR of the second scrambling code and the received packet.

6. The receiving apparatus of claim 4, wherein:
the first code generator has
a first linear feedback shift register generating a cyclic code according to a predetermined generator polynomial, and
a first length counter for counting bits of the encoded packet and resetting the first linear feedback shift register to a predetermined initial value after a first number of bits,
the first scrambling code including the first number of bits output from the first linear feedback shift register; and
the second code generator has
a second linear feedback shift register generating a cyclic code according to the predetermined generator polynomial, and
a second length counter for counting bits of the encoded packet and resetting the second linear feedback shift register to the predetermined initial value after a second number of bits,
the second scrambling code including the second number of bits output from the second linear feedback shift register.

7. The receiving apparatus of claim 4, wherein:
the first code generator has
a first linear feedback shift register generating a cyclic code according to a predetermined generator polynomial, and
a first length counter for counting bits of the encoded packet and resetting the first linear feedback shift register to a first initial value after a predetermined number of bits,
the first scrambling code including the predetermined number of bits output from the first linear feedback shift register; and
the second code generator has
a second linear feedback shift register generating a cyclic code according to the predetermined generator polynomial, and
a second length counter for counting bits of the encoded packet and resetting the second linear feedback shift register to a second initial value after the predetermined number of bits,
the second scrambling code including the predetermined number of bits output from the second linear feedback shift register.

8. The receiving apparatus of claim 4, wherein:
the first code generator has
a first linear feedback shift register generating a cyclic code according to a predetermined generator polynomial, and
a first length counter for counting bits of the encoded packet and resetting the first linear feedback shift register to a first initial value after a first number of bits,
the first scrambling code including the first number of bits output from the first linear feedback shift register; and
the second code generator has
a second linear feedback shift register generating a cyclic code according to the predetermined generator polynomial, and a second length counter for counting bits of the encoded packet and resetting the second linear feedback shift register to a second initial value after a second number of bits, the second scrambling code including the second number of bits output from the second linear feedback shift register.

9. A data receiving apparatus comprising:

a receiving unit for receiving an encoded packet including a CRC code;

a plurality of code generators for generating different scrambling codes;

a plurality of decoders for decoding the received encoded packet by using the different scrambling codes to obtain a plurality of decoded packets;

a plurality of checkers for using the CRC code to detect errors in the decoded packets; and a decision unit for deciding, from results of error detection by the plurality of checkers, whether any one of the decoded packets was decoded correctly.

* * * * *